United States Patent [19]

Yamada

[11] Patent Number: 5,228,099
[45] Date of Patent: Jul. 13, 1993

[54] APPARATUS FOR READING A DOCUMENT AND PROCESSING THE IMAGE

[75] Inventor: Masanori Yamada, Kawasaki, Japan

[73] Assignee: Canon Kabushiki Kaisha, Tokyo, Japan

[21] Appl. No.: 786,601

[22] Filed: Nov. 1, 1991

Related U.S. Application Data

[60] Division of Ser. No. 700,993, May 10, 1991, Pat. No. 5,086,486, which is a continuation of Ser. No. 570,971, Aug. 22, 1990, abandoned, which is a continuation of Ser. No. 205,575, Jun. 10, 1988, abandoned, which is a continuation of Ser. No. 775,013, Sep. 11, 1985, abandoned.

[30] Foreign Application Priority Data

Sep. 19, 1984 [JP] Japan ................. 59-196171
Sep. 19, 1984 [JP] Japan ................. 59-196172

[51] Int. Cl.$^5$ ............................................ G06K 9/20
[52] U.S. Cl. ............................. 382/61; 382/50; 382/51; 382/53; 358/449; 358/451; 358/464
[58] Field of Search ................. 382/40, 50-53, 382/61; 358/409, 448, 449, 451, 453, 462, 464, 474, 486, 488

[56] References Cited

U.S. PATENT DOCUMENTS

| 4,439,790 | 3/1984 | Yoshida | 358/449 |
| 4,449,152 | 5/1984 | Kurata et al. | 358/451 |
| 4,468,703 | 8/1984 | Fujiwara et al. | 358/282 |
| 4,475,234 | 10/1984 | Nishijima et al. | 382/50 |
| 4,539,478 | 9/1985 | Sano | 358/464 |
| 4,547,811 | 10/1985 | Ochi et al. | 382/53 |
| 4,554,592 | 11/1985 | Yoshida | 358/449 |
| 4,578,712 | 3/1986 | Matsunawa | 358/464 |
| 4,623,938 | 11/1986 | Asano et al. | 358/282 |
| 4,672,461 | 6/1987 | Yoshida | 382/53 |
| 4,701,807 | 10/1987 | Ogino | 382/50 |
| 5,086,486 | 2/1992 | Yamada | 382/53 |

FOREIGN PATENT DOCUMENTS 0113016 7/1984 European Pat. Off. .

Primary Examiner—Jose L. Couso
Attorney, Agent, or Firm—Fitzpatrick, Cella, Harper & Scinto

[57] ABSTRACT

An image processing system characterized by recognizing a document area and binarizing an image data read from a document based on an image data read from the recognized document area.

6 Claims, 6 Drawing Sheets

APPARATUS FOR READING A DOCUMENT AND PROCESSING THE IMAGE

This application is a division of application Ser. No. 07/700,993 filed May 10, 1991 now U.S. Pat. No. 5,086,486, which was a continuation of application Ser. No. 07/570,971, filed on Aug. 22, 1990, now abandoned, which was a continuation of application Ser. No. 07/205,575, now abandoned, filed on Jun. 10, 1988, which was a continuation of application Ser. No. 06/775,013, filed on Sep. 11, 1985, now abandoned.

BACKGROUND OF THE INVENTION

1. Field of the Invention

The present invention relates to an image processing system, and more particularly to a document image processing system.

2. Description of the Prior Art

In a binary processing system for an image signal, a document sheet is prescanned to detect a document density or determine a slicing level for binarization in order to binarize the read image signal based on the detected result. In one prior art system, the slicing level is determined based on information including unnecessary information on other than a document area on a document sheet table. As a result, genuine optimization is not attained. In another prior art system, the slicing level is determined based on an average document level or the background level. In this method too, an optimum binarization is not attained.

SUMMARY OF THE INVENTION

It is an object of the present invention to provide an image processing system which can attain an image of a proper image quality.

It is another object of the present invention to provide an image processing system which carries out processing based on necessary and effective image information in a document area.

It is another object of the present invention to provide an image processing system which detects a predetermined data read level and carries out processing based on a frequency of occurrence of such level detection.

It is another object of the present invention to provide an image processing system which can shorten preparative time for processing a read image.

It is another object of the present invention to provide a document image processing system which can detect a size of a document sheet and a frequency of occurrence of detection of a predetermined document density level.

DESCRIPTION OF THE PREFERRED EMBODIMENTS

Figure 1:
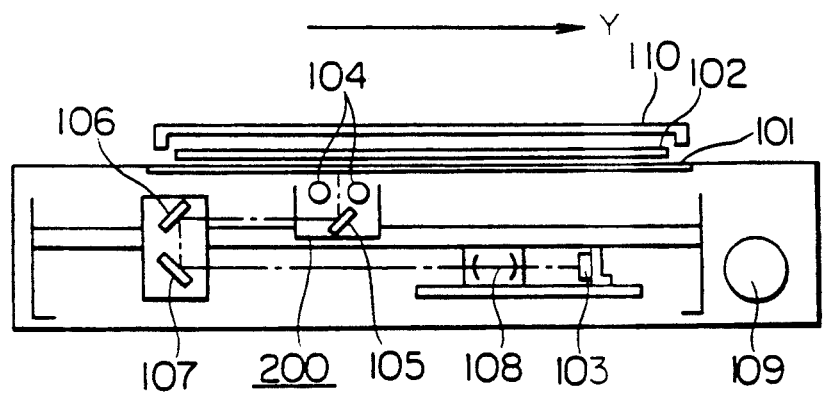
FIG. 1 is a schematic view of a document reader.

FIG. 1 shows a schematic view of a document reader to which the present invention is applied. In order to read image information of a document 102 placed on a document sheet table 101 and pressed by a document sheet cover 110, a line image pickup device 103 such as a CCD is used, and illumination light from a light source 104 is reflected by the surface of the document 102 and focused onto the image pickup device 103 by a lens 108 through mirrors 105, 106 and 107. The light source 104 and the mirror 105 are moved at a predetermined speed and the mirrors 106 and 107 are moved at one-half that speed. This optical unit is moved from left to right at a constant velocity by a DC servo motor 109 under a PLL control. This velocity is variable between 90 mm/sec and 360 mm/sec in forward movement, depending on magnification, and is fixed at 630 mm/sec in backward movement. A main scan line which is orthogonal to the sub-scan direction, along which the optical unit is moved, is read by the image pickup device at a resolution power of 16 pels/mm while the optical unit is forwardly moved from the left end to the right end, and then the optical unit is backwardly moved to the left end to complete one scan cycle. The document may be read while it is moved, so that total read time can be reduced.

Figure 2:
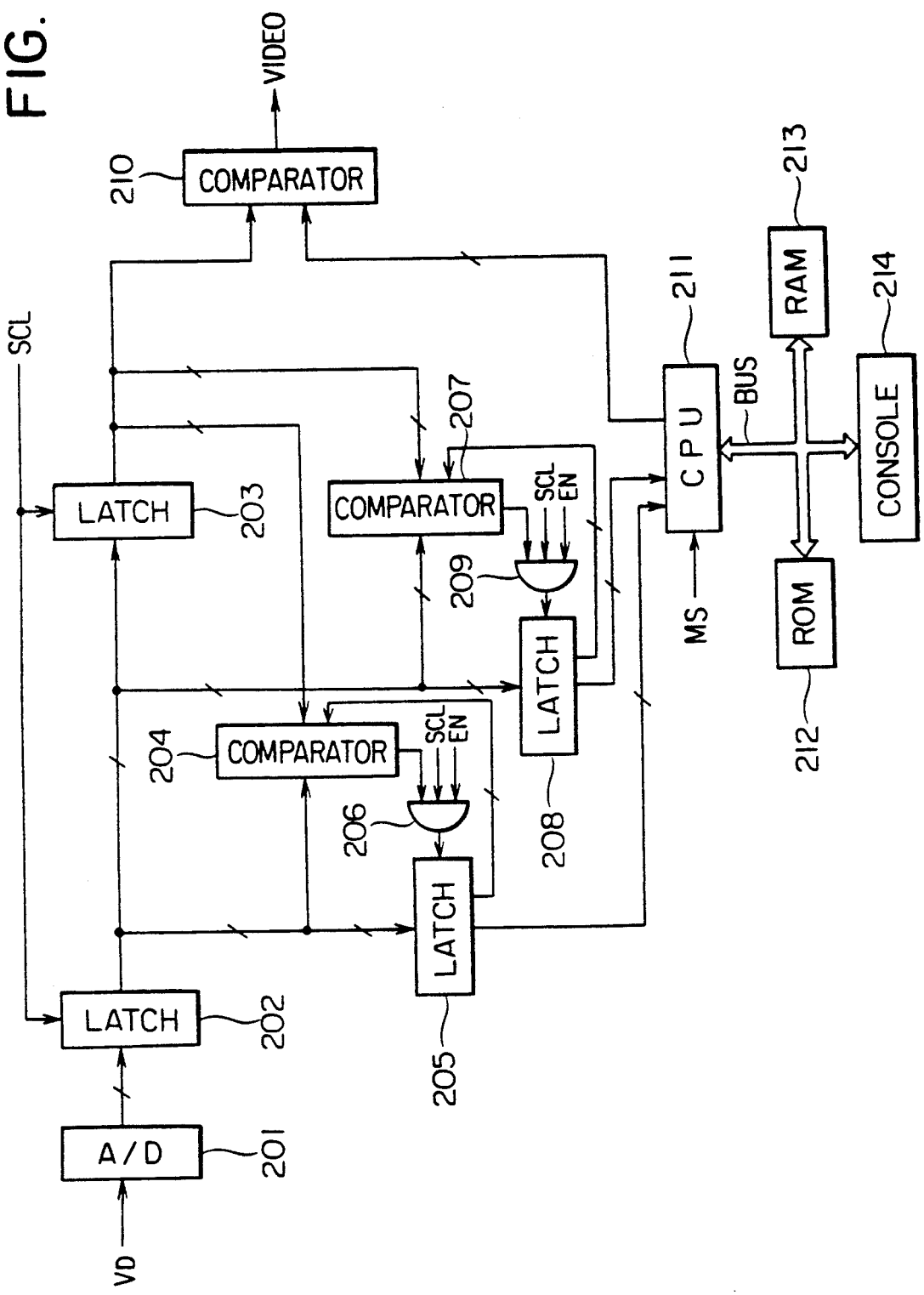
FIG. 2 is a block diagram of an image signal processing circuit.

FIG. 2 shows a block diagram of a circuit for processing an image signal from the image pickup device 103. The image signal $V_D$ read by the image pickup device 103 is converted to a 6-bit digital signal by an A/D converter 201, which signal is sent to latches 203, 205 and 208, and via latches 202 and 203 to comparators 204 and 207, in synchronism with a sampling clock SCL.

The comparator 204 compares the 6-bit image signal sent from the latch 202 with the 6-bit image signal of one clock period earlier sent from the latch 203 and supplies a comparison output to an AND gate 206 if the new image signal sent from the latch 202 is smaller. The AND gate 206 sends the comparison output from the comparator 204 to the latch 205 in synchronism with the sampling clock SCL.

The comparator 207 compares the 6-bit image signal sent from the latch 202 with the 6-bit image signal of one clock period earlier sent from the latch 203 and supplies a comparison output to an AND gate 209 if the new image signal sent from the latch 202 is larger. The AND gate 209 sends the comparison output from the comparator 207 to the latch 208 in synchronism with the sampling clock SCL.

When the latches 205 and 208 receive the comparison outputs, they send the image signal supplied from the latch 202 to a CPU 211.

The comparators 204 and 207 receive the image signal from the latches 205 and 208, respectively, and compare it with the succeeding image signal. If the succeeding image signal is smaller, the latch 205 is updated to the smaller level and the latch 208 retains the prior level.

In addition to the comparison outputs and the sampling clock SCL, an enable signal EN which indicates an effective period of the image signal from the image pickup device 103 is applied to the AND gates 206 and 209 so that the comparison results based on the image signal in a predetermined region in each main scan line are sent from the latches 205 and 208 to the CPU 211. The CPU 211 reads in the image signals from the latches 205 and 208 in synchronism with a main scan line synchronization signal MS so that it can detect the lowest density level (white peak) of the main scan line from the latch 205 and the highest density level (black peak) from the latch 208.

The CPU 211 determines a slicing level by an algorithm to be described later based on the white peak and the black peak detected for each line and sends it to a comparator 210. The comparator 210 compares the image signal from the latch 203 with the slicing level from the CPU 211 to produce a binarized signal VIDEO. Instead of the comparator 210, a binary output ROM may be provided in which the CPU 211 may select a pattern of the ROM based on the recognition by the latches 205 and 208, and the pattern may be addressed by data from the latch 203 to produce corresponding binary data. In this case, a half-tone image can be reproduced in binary form by a ROM which contains a dither pattern. The signal VIDEO is stored in a line memory of a printer (not shown) which modulates a laser beam to print an image. The signal VIDEO may be modulated and transmitted through a line.

Figure 3:
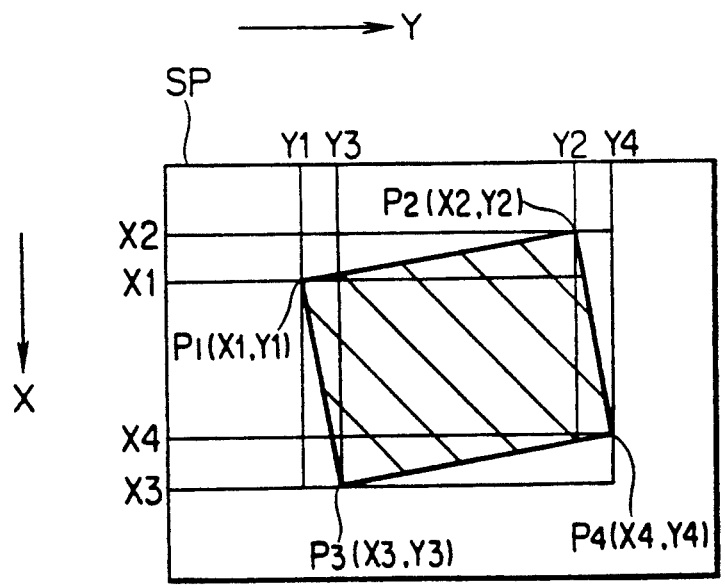
FIG. 3 shows a relationship between a document sheet placed on a document sheet table and position coordinates.

FIG. 3 shows the document sheet placed on the document sheet table 101 of the document reader (FIG. 1). Coordinates of four points $(X_1, Y_1)$, $(X_2, Y_2)$, $(X_3, Y_3)$ and $(X_4, Y_4)$ are detected by pre-scanning the optical system, where X is measured in a main scan direction from a reference coordinate SP on the document sheet table 101 and Y is measured in a sub-scan direction. The document sheet cover 110 (FIG. 1) is mirror-surface treated such that the image data from the area outside of that in which the document sheet is placed is always black data. The pre-scan comprises the main scan and the sub-scan to cover the entire area of the glass surface.

Figure 4:
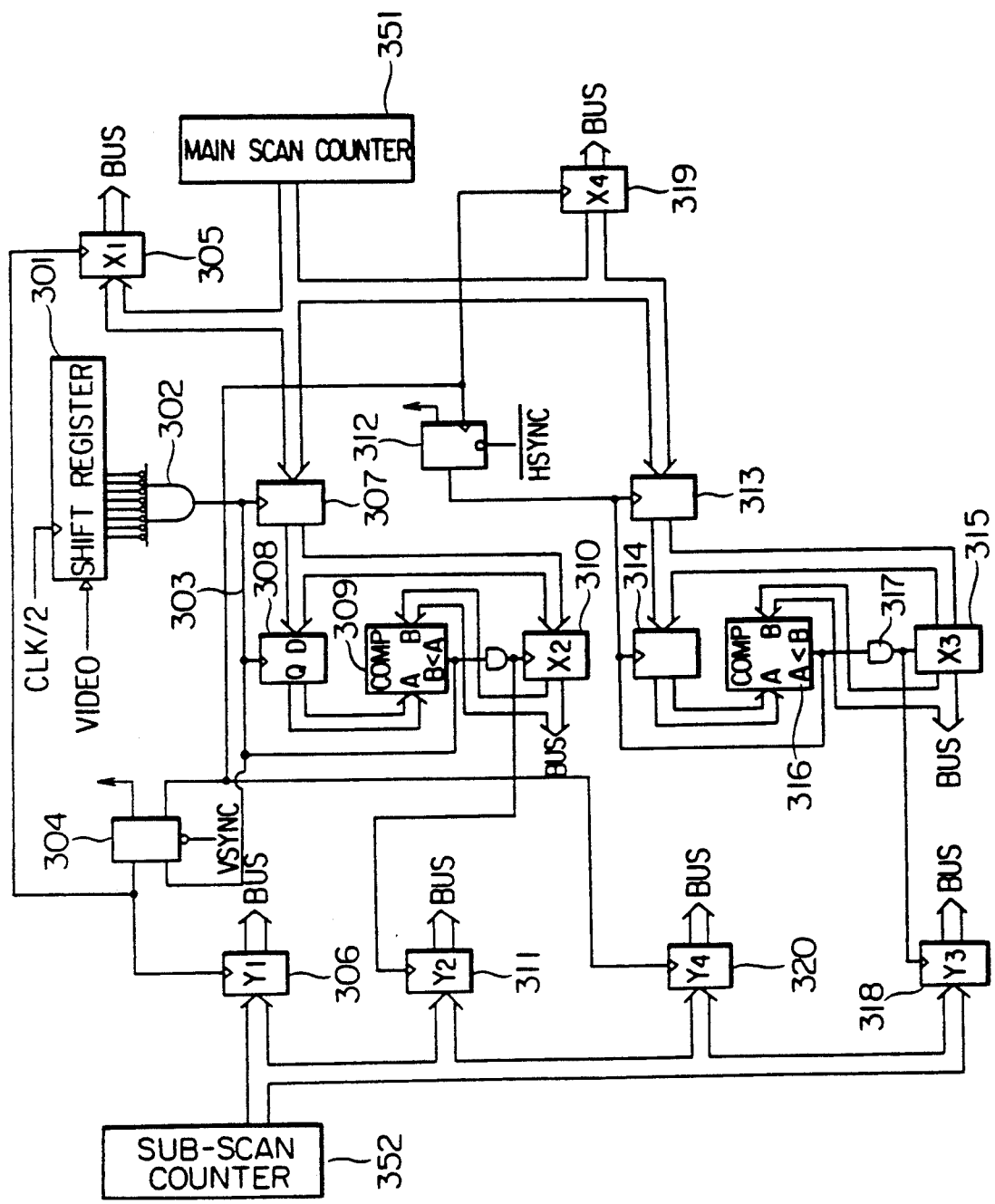
FIG. 4 shows a position coordinate detection circuit.

The circuit diagram of FIG. 4 shows logic circuitry to detect those coordinates. The image data VIDEO binarized by the pre-scan is supplied to a shift register 301 eight bits in parallel. At the end of the eight-bit input, a gate circuit 302 checks if all of the eight bits are white or not, and if yes, it outputs "1" on a signal line 303 when 8 bits of continuous white appears first after the start of scan of the document and a flip-flop 304 is set. The flip-flop 304 has been reset by an image leading edge signal VSYNC which is produced upon detection of a start position of the scan of the document. It is kept set until the next VSYNC appears. When the flip-flop 304 is set, the current content of a main scan counter 351 (which counts down SLC and is reset by HSYNC) is loaded to a latch 305. This information is the coordinate $X_1$. The current content of a sub-scan counter 352 is loaded to a latch 306. This information is the coordinate $Y_1$. Thus, $P_1(X_1, Y_1)$ is determined.

Each time the signal on line 303 is "1", the content of the main scan counter 351 is loaded to a latch 307, and is held in a latch 308 until the next 8-bit signal is supplied to the shift register 301. As the data contained in the main scan counter when the first 8-bit white signal appears is loaded to the latch 308, data in a latch 310 (which is reset to "0" by VSYNC) is compared by comparator 309 with the data received by latch 308 from the main scan counter. If the data in the latch 308 is larger, the data in the latch 307 (which is the same as that in latch 308) is loaded to latch 310. The content of the sub-scan counter 352 is loaded to a latch 311. This is done before the next 8-bit signal is supplied to the shift register 301. In this manner, the data of the latches 308 and 310 is processed for the entire image area so that the maximum value in the X direction of the document area is left in the latch 310 and the corresponding Y coordinate is left in the latch 311. This is the coordinate $P_2(X_2, Y_2)$.

A flip-flop 312 is set when the 8-bit white signal first appears in each main scan line. It is reset by a horizontal synchronization signal HSYNC (which is produced in each scan of the document line) and set by the first 8-bit white signal and holds it until the next HSYNC. When the flip-flop 312 is set, the content of the main scan counter is loaded to a latch 313 and then to a latch 314 before the next HSYNC appears. The content of the latch 314 is compared with the content of a latch 315 by a comparator 316. The latch 315 contains the maximum value in the X direction when VSYNC was produced. If the data in the latch 315 is larger than the data in the latch 314, a signal on line 317 is active and the data in the latch 314, that is, the data in the latch 313, is loaded to the latch 315. This is done between a period of HSYNC-HSYNC. The above comparison is made for the entire image area so that the minimum value in the X direction of the document coordinate is left in the latch 315. This is $X_3$. When the signal 317 is produced, the value of the sub-scan is loaded to a latch 318. This is $Y_3$.

Each time the 8-bit white signal appears, the current content of the main scan counter and the current content of the sub-scan counter are loaded to the latches 319 and 320, respectively. As a result, at the end of the pre-scan of the document, the counts when the last 8-bit white signal appeared are left in the counters. This is $(X_4, Y_4)$.

The data lines of the eight latches (306, 311, 320, 318, 305, 310, 315 and 319) are connected to the bus line BUS of the CPU of FIG. 2 so that the CPU reads in those data at the end of the pre-scan.

Figure 5:
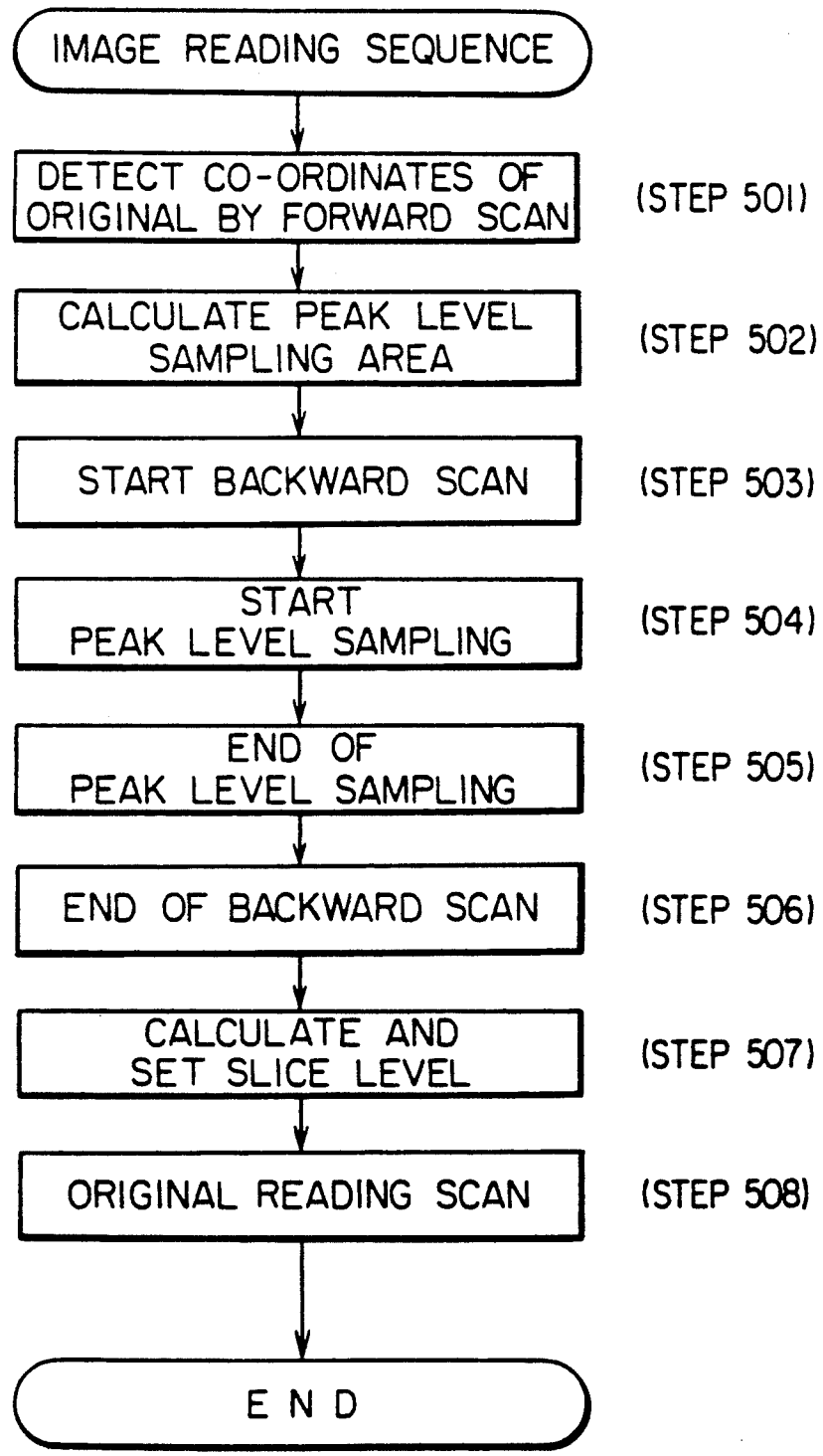
FIG. 5 is a flow chart of an image read sequence.

FIG. 5 shows a flow chart of the document read sequence. A program therefore is contained in the ROM of FIG. 2 and executed by the CPU.

In a step 501, the optical system forwardly scans from the left end to the right end of FIG. 1 to detect the coordinates of the document sheet on the document sheet table as shown in FIG. 4.

Figure 6:
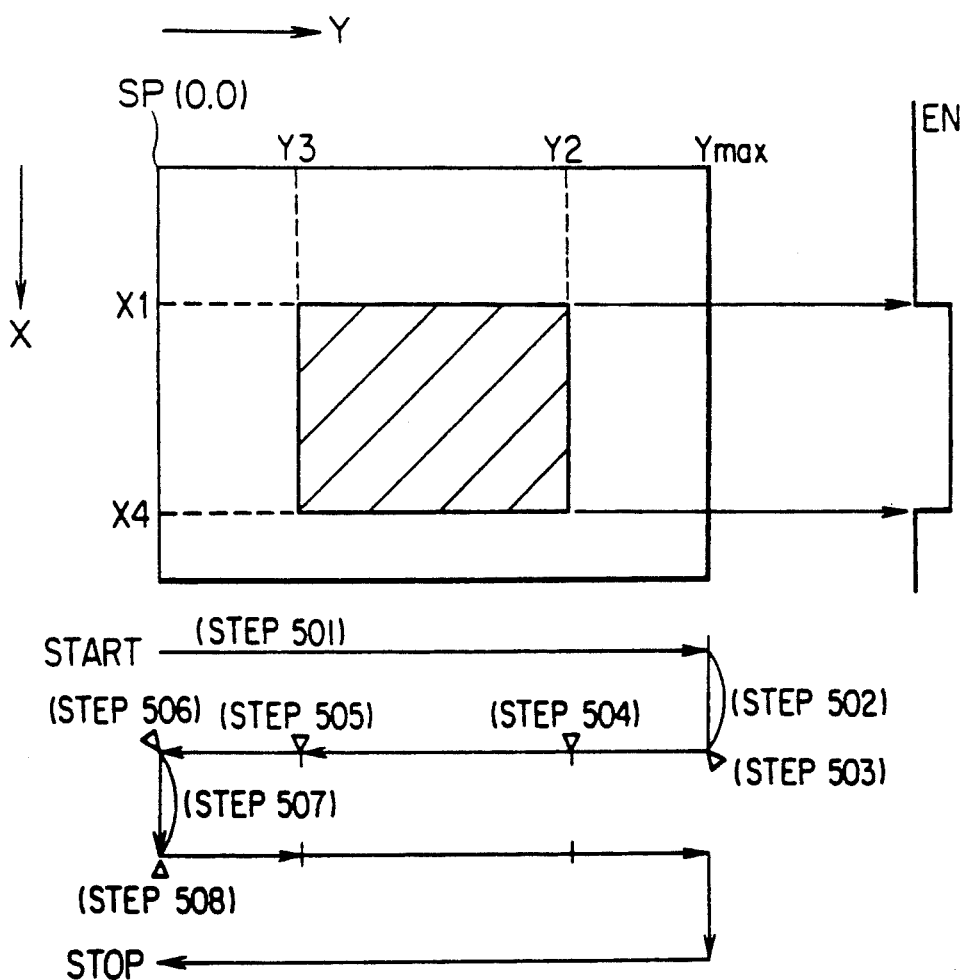
FIG. 6 shows a relationship between a document position and an operation sequence.

In a step 502, the area for sampling the peak value to determine the slicing level for the binarization is calculated based on the coordinate data detected in the step 501. For example, based on the coordinate detected for the document shown by a hatched area in FIG. 3, a rectangular area defined by $Y_3, Y_2, X_1$ and $X_4$ is selected as the area for sampling the peak value. The document sheet is usually placed as nearly parallel as possible to the document sheet table, and even if it is placed obliquely as shown in FIG. 3, there is no possibility that undesired information from outside of the document will be picked up. The sampling area may be determined using other methods. FIG. 6 shows a scan path. At the end of the document coordinate detection, the optical system is at Ymax in the sub-scan direction. Since the start point $Y_2$ for sampling the peak and the end point $Y_3$ are known, an execution schedule for steps 504, 505 and 506 can be established. In a step 503, the backward scan is started and the CPU 211 counts the main scan line synchronization signals, corresponding in number to a distance $Ymax - Y_2$, and then starts to detect the white peak/black peak, then counts the main scan line synchronization signals, corresponding in number to a distance $Y_2 - Y_3$, and then completes the peak detection. Then, it counts the main scan line synchronization signals, corresponding in number to a distance $Y_3$, and then stops the backward scan.

In the step 504, at the start of the peak detection, the enable signal EN is set in accordance with the detected coordinates $X_1$ and $X_4$ as shown in FIG. 6.

In this manner, the white peak and the black peak of the image density in each main scan line of the document placed at any position on the document sheet table can be detected.

An algorithm for determining the slicing level for the binarization is now explained.

The CPU 211 reads in the black peak and the white peak of each main scan line in the document area and stores then in the RAM.

The black peak BPi and the white peak WPi on the i-th main scan line have a relationship of $BPi \geq WPi$ and assume values between 00 (HEX) and 3F (HEX) because the image data are 6-bit data.

The RAM has the $64 \times 2$-byte black peak histogram area and the $64 \times 2$-byte white peak histogram area, and stores frequencies of BPi, WPi each having 64 stepped levels in an area thereof corresponding to the level. The CPU increments the contents (or frequencies) of the 2-byte areas for the detected BPi and WPi, waits for the next main scan line synchronization signal MS, then reads in the data $BPi+1$ and $WPi+1$ of the $(i+1)$th line and again increments the frequencies in the corresponding histogram areas, and continues the above operation until the end of the sampling in the step 505.

The detected BPi and WPi are not necessarily used as the histogram data. For example, if a band of a uniform density, whether it is white or black or other density, exists in the direction of the main scan line, the samples BPi and WPi therefrom are substantially equal and they are not appropriate for the binarization information for discriminating the information from the background. Accordingly, if $BPi - WPi \leq \alpha$, the CPU does not use them as histogram data but discards them and waits for $BPi+1$ and $WPi+1$. The constant $\alpha$ is experimentally determined and it may be 4 or 3, for example. Before the start of the sampling in the step 504, all histogram area bytes ($64 \times 2 \times 2$ bytes) are cleared to zero.

Figure 7A:
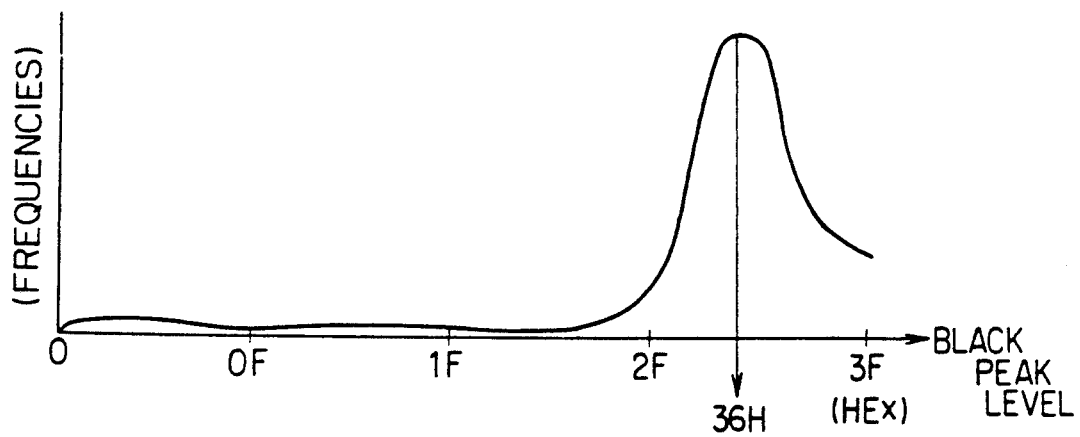
FIGS. 7a–b show a black peak histogram and a white peak histogram.
Figure 7B:
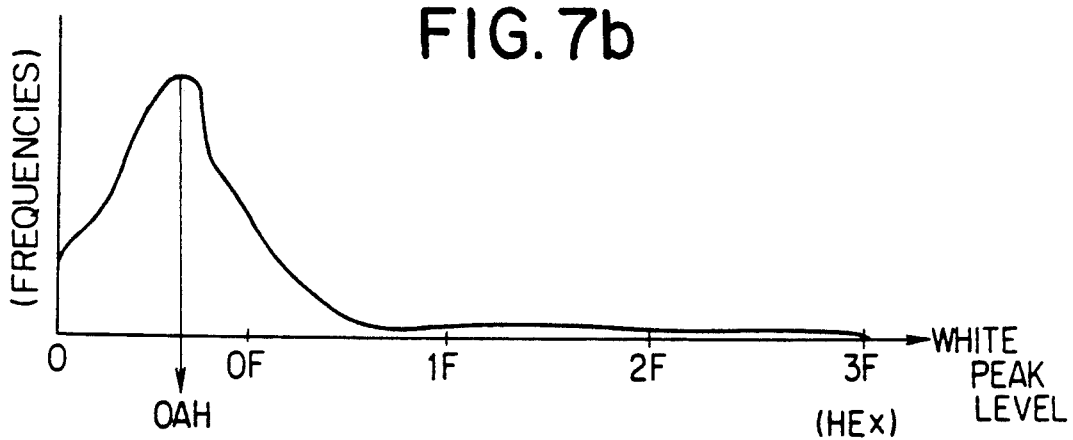

As a result, at the end of the sampling in the step 505, histograms for the black peak and the white peak are constructed as shown in FIG. 7. After the sampling, the optical system is returned to the start position. At the end of the backward scan in the step 506, the slicing level is set in the step 507.

Density levels indicating the peaks of the histograms are taken as representatives. Thus, count results relating to the respective levels of the histogram are compared with each other so that the density level having the maximum count result is taken as the maximum frequency level.

In the example shown in FIG. 7, the density of the document information area is 36H and the density of the document background area is OAH, and an intermediate density 20H is taken as the slicing level.

The slicing level may be determined by the frequency of occurrence of other levels of the read data. In addition to the slicing level, a dither pattern stored in the ROM or an output pattern may be selected A $\gamma$-conversion characteristic for tonality correction may be selected, or the intensity of an exposure lamp may be adjusted to control the density of a copy. If the black peak and the white peak are in the vicinity of 1F, it indicates that many half-tone areas are included and $\gamma$ is selected to produce a high quality of image. The detected slicing level, peaks or the distribution of FIG. 7 may be displayed.

Finally, the document is scanned in the step 508 to complete the operation.

When the same document is continuously scanned a plurality of times to make a plurality of copies, the slicing level and the ROM pattern thus obtained are held and, after the plurality of copies are made, they are cancelled. When a new document is to be scanned, the slicing level and the ROM pattern are cancelled and the new pre-scan is carried out. The pre-scan may be selectively carried out as required. The pre-scan may be omitted to increase the copy speed.

Figure 8:
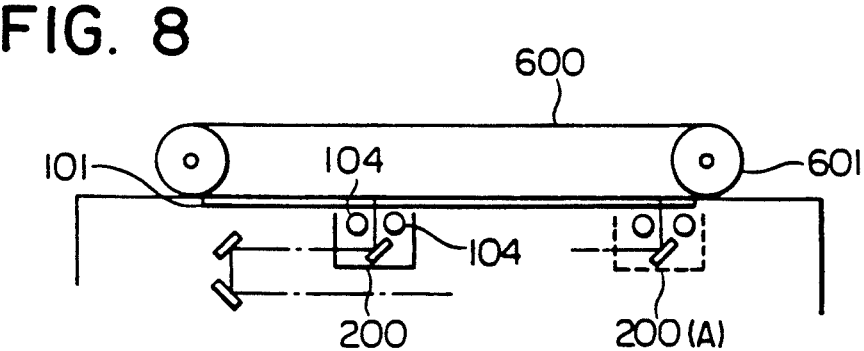
FIG. 8 is a schematic view of another document reader.

In an embodiment shown in FIG. 8, a document sheet 601 is automatically set on a glass 101 by a belt 600, and it is automatically ejected after reading. A scan unit 200 is positioned at A and the document sheet 601 is moved by the belt so that it is set at an exposure position, and the document is read while the scan unit 200 is stationary. An area necessary to determine width and length of the document sheet is determined from the read data. The scan unit is moved backward (to the left in FIG. 8) from position A and the document level is determined. When the scan unit reaches the left end, it starts the forward movement and the binarization is effected based on the level recognition of the necessary and effective document area.

If the binarization based on the recognition is not required, the data read from the moving document while the scan unit is stopped at A may be binarized by a predetermined slicing level so that the read time can be reduced.

What I claim is:

1. An image processing apparatus comprising:
    reading means for reading an original document to produce an image signal, said reading means being capable of reading a plurality of pixels in a main scan direction;
    scanning means for reciprocatingly scanning the original document by relatively reciprocating said reading means in a sub-scan direction;
    recognizing means for discriminating between (1) a first area where the original document is present and (2) a second area where the document is not present, on the basis of the image signal from said reading means;
    detecting means for detecting an image density level in the first area; and
    conversion means for converting the image signals from said reading means into reproduction signals on the basis of the image density level detected by said detecting means,
    wherein said recognizing means recognizes the first area on the basis of the image signal obtained from said reading means while said scanning means moves said reading means forward, and
    said detecting means detects an image density level on the basis of the image signal in the first area obtained from said reading means while said scanning means moves said reading means backward.

2. An image processing apparatus according to claim 1, wherein said recognizing mean recognizes the area where the original document is present by identifying coordinates where an original document is present.

3. An image processing apparatus according to claim 1, wherein said detecting means detects an image density level on the basis of the maximum and minimum values of the image signal.

4. An image processing apparatus according to claim 1, wherein said detecting means detects an image density level in the rectangular area recognized by said recognizing means.

5. An image processing apparatus according to claim 1, wherein said conversion means processes the image signal on the basis of the frequency of the image density levels.

6. An image processing apparatus according to claim 1, wherein said conversion means forms a reference signal for quantization and quantizes the image signal on the basis of the reference signal.

* * * * *